MELVIN H. BEST
INVENTOR.

ATTORNEY

Jan. 12, 1960   M. H. BEST   2,920,900
SHOPPING CART
Filed April 9, 1956   3 Sheets-Sheet 2
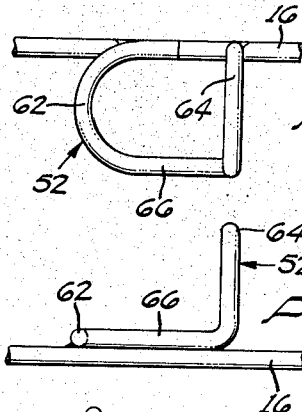
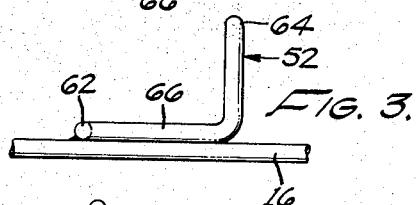
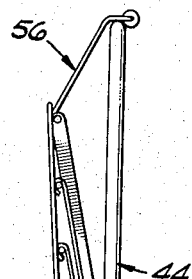
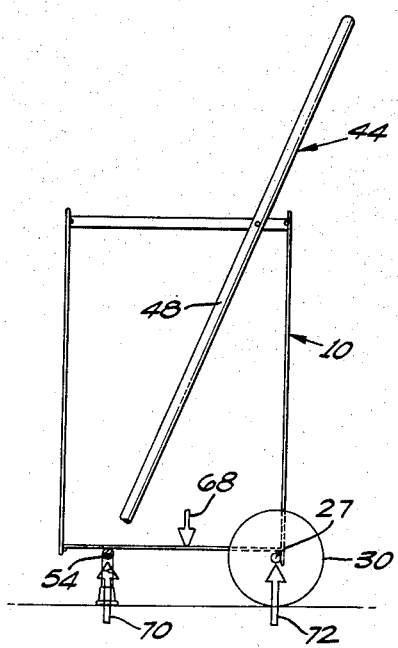
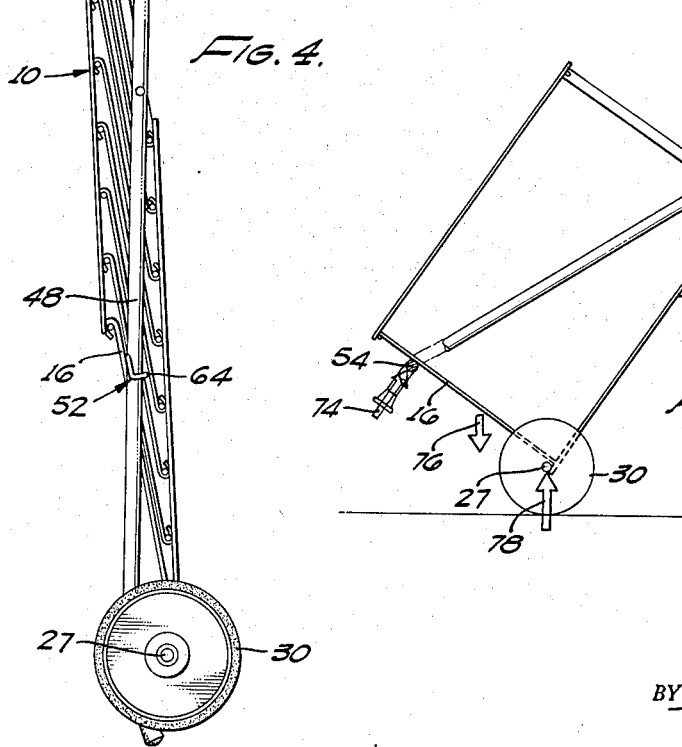
INVENTOR.
MELVIN H. BEST
BY
ATTORNEY

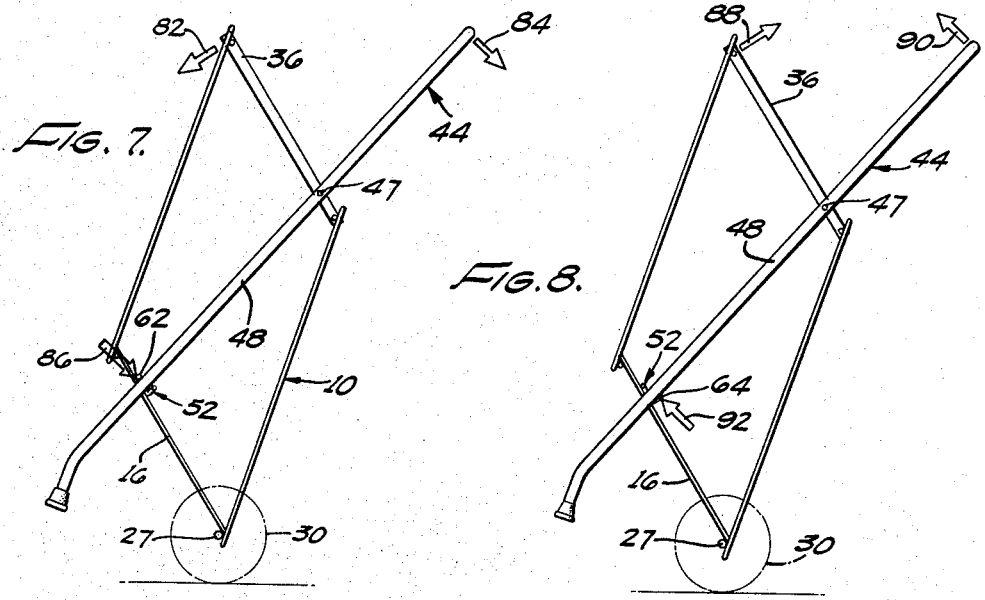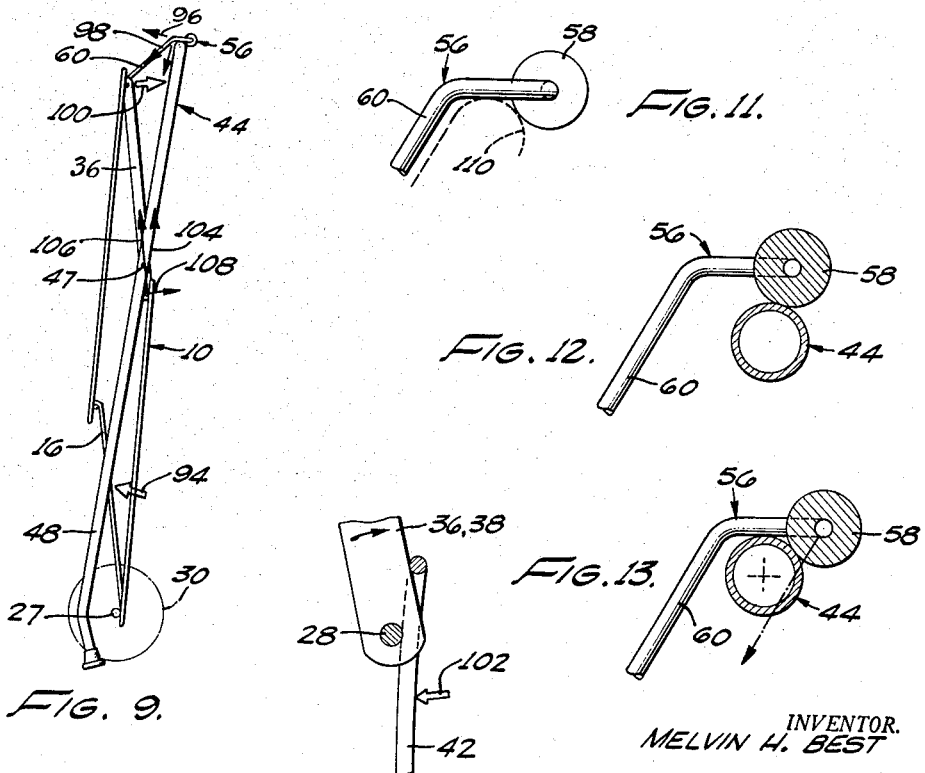

United States Patent Office 2,920,900
Patented Jan. 12, 1960

2,920,900

SHOPPING CART

Melvin H. Best, Pasadena, Calif., assignor to The Cal-Dak Company, San Marino, Calif., a corporation of California Application April 9, 1956, Serial No. 577,068

6 Claims. (Cl. 280—36)

This invention relates to package and article carriers and more particularly to collapsible shopping baskets.

It is an object of the invention to provide a shopping cart which may be more easily and economically manufactured.

It is another object of the invention to provide a shopping cart which, when folded up, will occupy only a relatively small amount of space as compared to its erected size.

It is a further object of the invention to provide a shopping cart which may be more easily collapsed and unfolded than shopping carts of conventional design.

It is a still further object of the invention to provide easily operable means on a collapsible shopping cart to lock it in its collapsed position.

These and other objects and advantages of the present invention will be better understood when considered with the following description taken in connection with the accompanying drawings made a part of this specification, wherein an embodiment is illustrated by way of example. The device of the present invention is by no means limited to the specific embodiment illustrated in the drawings since it is shown merely for purposes of description.

Figs. 2 and 3 are respectively enlarged plan and elevation views of a loop of wire to encircle the legs of the shopping cart shown in Fig. 1;

Fig. 4 is a side elevation view of the shopping cart as it is collapsed;

Fig. 5 is an elevation view of the shopping cart unfolded;

Fig. 6 is a side elevation view of the shopping cart in the position in which it is moved;

Fig. 7 is a side elevation view of the shopping cart with arrows indicating internal reacting forces when the shopping cart is unfolded;

Fig. 8 is a side elevation view of the shopping cart showing internal forces as the shopping cart is being collapsed;

Fig. 9 is a side elevation view of the shopping cart shown with the forces reacting within the frame when the shopping cart is locked in its collapsed position;

Fig. 10 is a broken-away vertical sectional view at the upper right hand corner of a basket part of the shopping cart shown in Fig. 9; and Figs. 11, 12 and 13 are broken side elevation views of the latching device of the shopping cart.

Figure 1:
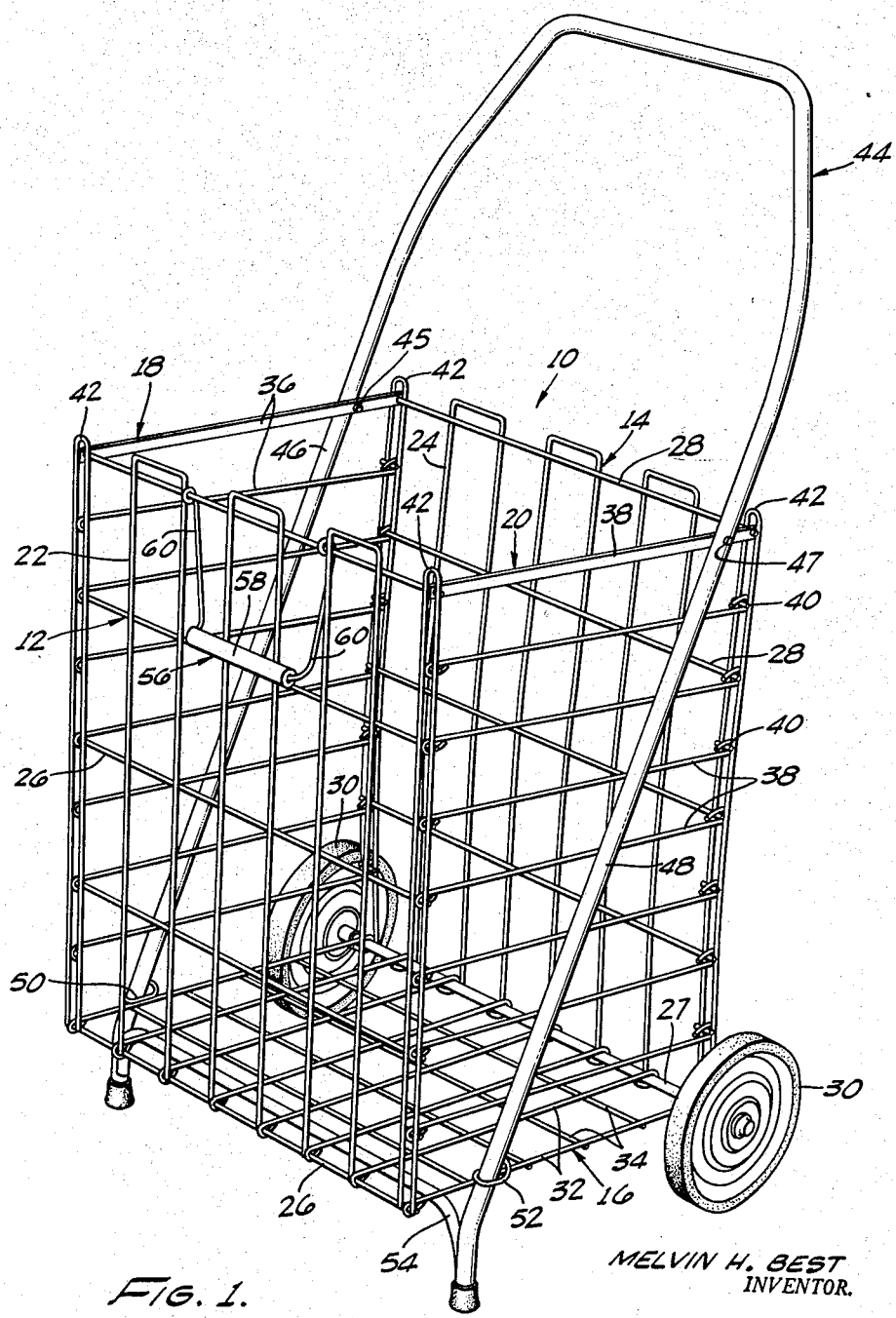
Fig. 1 is a perspective view of one embodiment of of the shopping cart of the present invention.

In the drawings in Fig. 1 the collapsible shopping cart is shown comprising a collapsible basket 10 having a front framework 12, a rear framework 14, a bottom framework 16 and side frameworks 18 and 20. The front and rear frameworks 12 and 14 are respectively provided with vertical wires 22 and 24 which are preferably welded to horizontal wires 26 and 28. The vertical wires 24 of the rear framework 14 are preferably welded at their lower ends to an axle 27 on each end of which a pair of wheels 30 are rotatably mounted. The bottom framework 16 is provided with longitudinally extending wires 32 to which a plurality of transversely extending wires are welded. The longitudinally extending wires 32 are preferably bent around the axle 27 and the lower of the horizontally disposed wires of the front framework 12. The bottom framework 16 is thus hingedly connected to the lower end of both the front and the rear frameworks 12 and 14.

The side frameworks 18 and 20 comprise simply a plurality of horizontally disposed bars 36 and 38 respectively which are hingedly connected to the vertical edges of the front and rear frameworks 12 and 14. The side frameworks 18 and 20 are adapted to rotate in the vertical parallel planes of the edges of the front and rear frameworks 12 and 14 on each side of the basket 10. All but the upper of the horizontally disposed bars 36 and 38 are bent around either the horizontally disposed wires 26 and 28 in the front and rear frameworks 12 and 14 or around wire segments 40 which are welded to U-shaped members 42 forming the vertical edges of the front and rear frameworks 12 and 14. The lower ends of the U-shaped members 42 in the front framework 12 are preferably welded to the lower and upper horizontal wires 26 of the front framework. Similarly the U-shaped members 42 of the rear framework 14 are preferably welded to the upper horizontal wire 28 and to the axle bar 27. The upper of the horizontally disposed bars 36 and 38 may comprise a strip of metal having apertures at opposite ends through which the upper of the horizontal wires 26 and 28 on the front and rear frameworks 12 and 14 may project.

A U-shaped handle 44 is pivotally mounted at points 45 and 47 on its sides on the upper of the horizontally disposed bars 36 and 38, sides 46 and 48 of the U-shaped member 44 forming legs for the cart. These legs extend through loops 50 and 52 which are welded to the bottom framework 16 to guide the movement of the legs 46 and 48 when the cart is collapsed. It is to be noted that the legs 46 and 48 extend below the bottom framework 16 to support the frontal portion of the bottom framework 16 of the cart 10 by means of a bar 54 rigidly fixed to the lower ends of the legs 46 and 48.

Hook means 56 are mounted on the upper horizontal bar 26 of the front framework 12 to lock the cart in its collapsed position. In this position the hook means 56 is disposed over the upper portion of the U-shaped handle 44. The hook means 56 preferably comprises a cylindrical body 58 which may be hollow and made of wood. The body 58 accordingly may be mounted at the ends of and between a pair of hook-shaped wires 60 that are rotatably mounted upon the upper horizontally disposed wire 26 of the front framework 12.

The loop or ring 52 is shown in plan view in Fig. 2. It is to be noted that the end portions 62 and 64 of the ring 52 project outwardly from the bottom framework 16 and are substantially the only functional portions of the ring 52. That is, the side portion 66 merely makes the construction of the ring 52 somewhat simpler and adds strength to the projections 62 and 64. The side portion 66 is thus not absolutely necessary. Each of the projections 62 and 64 serve different purposes. The frontal projection 62 that bears upon the front portion of the leg 48 prevents the leg 48 from rotating upwardly in a direction towards the front framework 12 to a position where the lower extremities of the legs 46 and 48 will no longer support the basket 10 below the bottom framework 16. It is to be noted that the projection 62 is not absolutely needed to prevent this rotation since the crossbar 54 accomplishes the same purpose. The projection 62, however, also facilitates opening the shopping cart when it is collapsed. This will be explained subsequently.

The projection 64 similarly has a dual function. In the first place it facilitates collapsing the cart. In the second place, it cooperates with the leg 48 to effectively latch the cart in its collapsed position. The angular shape of each of the loops or rings 50 and 52 is, of course, not necessary to practice the invention although this configuration is preferred so that the internal portions of the forward projections of the loops 50 and 52 will engage the frontal portions of the legs 46 and 48 when the cart is unfolded and that the rear projections of the rings 50 and 52 will engage the rear portions of the legs 46 and 48 when the cart is collapsed.

Fig. 4 is a side elevation view of the cart when collapsed. It is seen that in this position the projection 64 of the ring 52 snugly fits the rear portion of the leg 48. The hook means 56 is then secured over the upper end of the U-shaped handle 44. By the nature of the construction of the rear framework 14 of the basket 10, the basket 10 is resiliently urged to open. This keeps the hook means 56 securely in place on the upper portion of the handle 44. This feature of the invention will be hereafter explained more fully. It can be seen that the cart when collapsed as shown in Fig. 4 is very compact. It is also seen that the legs 46 and 48 of the U-shaped handle 44 are conveniently guided to this compact position by the rings 50 and 52.

To show that the frontal projections of the rings 50 and 52 are not absolutely necessary to practice the invention, force diagrams are provided in Figs. 5 and 6. When the cart is resting upon the legs 46 and 48 of the cart and on wheels 30 through axle 27, it is seen that all that is needed to support the cart besides wheels 30 through axle 27 is the crossbar 54 as indicated by the arrow 68. The weight of the cart is thus supported at the bar 54 as indicated by the arrow 70 and axle bar 27 as indicated by the arrow 72.

In order to move the cart, the cart is tilted as indicated in Fig. 6. In this case the crossbar 54 still supports the frontal portion of the bottom framework 16 as indicated by the arrow 74. The weight of the cart is indicated by the arrow 76 and the rear portion of the basket 10 is supported at the axle bar 27 as indicated by the arrow 78. In order to maintain the cart in this tilted position, a small force is normally applied at the top of the U-shaped handle 44 as indicated by the arrow 80.

Use of the frontal projections of the rings 50 and 52 or in particular one of the frontal projections, such as the projection 62, is preferably made to facilitate opening the shopping cart into its collapsed position. Preferably the cart is opened by unlatching the hook means 56 and rotating the handle 44 and the upper of the horizontally disposed bars 36 and 38 in opposite directions with respect to each other as indicated by the arrows 82 and 84 in Fig. 7. When the force 84 is applied in a direction to cause the handle 44 to rotate in a clockwise direction with respect to bars 36 and 38 as viewed in Fig. 7 about the pivotal mounting 47, the frontal projection 62 limits this rotation to make unfolding the basket 10 a simple operation. The rotation of the handle 44 is impeded by the force of the frontal projection 62 as indicated at the arrow 86.

The rear projection 64 of the ring 52 also facilitates closing or collapsing the cart. This is shown in Fig. 8 where force is generally applied to the upper horizontally disposed bars 36 and 38 and the handle 44 of the cart. Forces are applied on respective horizontal bars and handle as indicated by the arrows 88 and 90. The force applied in the direction of the arrow 90 will thus tend to cause the handle 44 to rotate about the pivotal mounting 47. This rotational force is impeded by the projection 64 as indicated by the arrow 92.

The projection 64 performs a dual function. As stated in the previous paragraph, it provides means by which the cart may be collapsed in a convenient manner. Secondly, it is employed to maintain the cart securely in its collapsed and latched position. The projection 64 in this case applies a force similar to the force 92 in the direction of the arrow 94. The handle 44 tends to rotate about the pivotal mounting 47 as indicated by a force component 96 of a force indicated by an arrow 98 along the hook means 56. Since the hook means 56 is in tension, the upper ends of the upper horizontal bars 36 and 38 as viewed in Fig. 9 are urged upwardly toward the upper end of the handle 44 as indicated by the arrow 100. The force that actually puts the hook means 56 and specifically the wires 60 in tension is related to the construction of the rear framework 14 with the upper of the horizontal bars 36 and 38. This is specifically shown in Fig. 10 where a U-shaped member 42 is shown disposed over the rear end of the upper horizontal bar 36. The upper horizontal bars 36 and 38 are pivoted from the upper horizontal wire 28 in the rear framework 14. As the topmost portion of the upper bars 36 and 38 engage the upper portion of the loop formed by the U-shaped members 42, the U-shaped members 42 are bent inwardly as indicated at the arrow 102. This bending strain acts as resilient means and as the U-shaped members 42 tend to assume the original shapes, a force is applied through the upper horizontal wire 28 of the rear framework 14 to the upper of the horizontal bars 36 and 38 and a force is thereby applied at the end of the upper horizontal bars 36 and 38 as indicated by the arrow 104 shown in Fig. 9. The components of this force are divided into an axial component 106 and a normal component 108. The normal component 108 tends to rotate the upper of the horizontal bars 36 and 38 in a counter clockwise direction as viewed in Fig. 9. Thus the wires 60 of the hook means 56 are put in tension and the upper end of the hook means 56 is securely fixed around the upper end of the handle 44.

The hook shape of the hook means 56 is shown by a dotted line 110 in Fig. 11. In Fig. 12 the ease with which the hook means 56 may be urged around the handle 44 is shown. Specifically, the fact that the body 58 is cylindrical makes it relatively easy to pass the hook means 56 over the upper end of the handle 44. In addition, the fact that the cylindrical body 58 is rotatable on the wires 66 reduces still further the frictional engagement of the cylindrical body 58 with the handle 44. Fig. 13 is a sectional view of the hook means 56 in position on the handle 44.

It can therefore be seen that loops 50 and 52 in combination with the collapsible basket and pivoted legs 46 and 48 provide a convenient manner of both folding and unfolding the shopping cart and in particular folding it to a compact position. Furthermore, it can also be seen that easily operable hook means 56 may be employed to lock the shopping cart in its collapsed position.

It will be understood that while one specific embodiment of the invention has been disclosed, various changes in structure and the arrangement of parts, and substitution of equivalent means for those shown, may be made without departing from the true scope of the invention as defined in the appended claims.

What is claimed is:

1. A collapsible shopping cart comprising: a basket having a rectangular bottom framework, a front portion including a rectangular front framework, and a rear portion including a rear framework, said front and rear frameworks being hingedly connected from parallel front and rear ends of said bottom framework, and two side frameworks connected from vertical edges of said front framework to vertical edges of said rear framework to rotate in parallel vertical planes; a leg on each side of said basket extending generally downwardly from a position above said bottom framework and in a direction toward it and toward said front framework to a point below said bottom framework, first means pivotally mounting each leg on each corresponding side of said basket, second means fixed to each side of said basket forward of and below said first means to provide a rigid loop to encircle each of said legs, said legs being slidable in said loops; third means fixed to said legs above the lower ends thereof to extend under said bottom framework to support the forward portion of said basket; and a pair of wheels suspended from said basket rearward of said rigid loop means to support the rear portion of said basket.

2. The invention as defined in claim 1, wherein said third means is a rigid bar fixed at its ends to said legs.

3. The invention as defined in claim 1, wherein said side frameworks comprise a plurality of horizontally disposed rigid rods mounted from the vertical edges of said front and rear frameworks to rotate in vertical planes defined by said vertical edges.

4. The invention as defined in claim 3, wherein said third means is a rigid bar fixed at its ends to said legs, first means including means to pivotally mount each of said legs from one of said rigid rods, and wherein a handle is connected to the upper ends of said legs.

5. A collapsible shopping cart comprising a reticulated rear section having ground engaging wheels thereon, a folding forward section having pivotal means thereon to hingedly support said folding section upon said rear section along a plurality of horizontal axes, and a U-shaped frame pivotally secured at the sides thereof to a corresponding side of said cart, the bottom portion of said folding section having a bracket thereon slidably articulated with said frame, and locking means on the forward portion of said forward section, said locking means resiliently engaging said frame when the shopping cart is in fully collapsed position.

6. A collapsible shopping cart comprising a rear section having ground engaging wheels thereon, a folding forward section having pivotal means thereon to hingedly support said folding section upon said rear section along a plurality of horizontal axes, a U-shaped frame pivotally secured at the sides thereof to a corresponding side of said cart and extending in a downwardly and forwardly direction and a bracket fixed to the bottom forward portion of said folding section, said U-shaped frame being slidable in said bracket upon collapsing of the cart.

References Cited in the file of this patent

UNITED STATES PATENTS

| | | |
|---|---|---|
| 1,244,030 | Cave | Oct. 23, 1917 |
| 2,438,829 | Skolnik | Mar. 30, 1948 |
| 2,468,604 | Salat | Apr. 26, 1949 |
| 2,728,580 | Preisler | Dec. 27, 1955 |
| 2,758,847 | Shone | Aug. 14, 1956 |

FOREIGN PATENTS

| | | |
|---|---|---|
| 623,169 | France | Oct. 15, 1926 |
| 256,391 | Great Britain | Aug. 12, 1926 |